US006687834B1

(12) United States Patent
Morales, Jr. et al.

(10) Patent No.: US 6,687,834 B1
(45) Date of Patent: Feb. 3, 2004

(54) DATA PROCESSING SYSTEM, METHOD AND PROGRAM FOR GENERATING A JOB WITHIN AN AUTOMATED TEST ENVIRONMENT

(75) Inventors: Rene Morales, Jr., Austin, TX (US); Charles Vaughn Rankin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/550,386

(22) Filed: Apr. 14, 2000

(51) Int. Cl.$^7$ .............................. G06F 11/00; H04L 9/00
(52) U.S. Cl. ........................ 713/201; 714/38; 705/24; 705/50
(58) Field of Search ............................... 713/200, 201; 714/38, 40, 39; 705/41, 31, 51

(56) References Cited

U.S. PATENT DOCUMENTS

| | | |
|---|---|---|
| 4,970,725 A | 11/1990 | McEnroe et al. |
| 5,021,997 A | 6/1991 | Archie et al. ............... 364/900 |
| 5,136,705 A | 8/1992 | Stubbs et al. |
| 5,446,652 A | 8/1995 | Peterson et al. |
| 5,500,941 A | 3/1996 | Gil |
| 5,544,310 A | 8/1996 | Forman et al. ......... 395/183.07 |
| 5,634,098 A | 5/1997 | Janniro et al. ......... 395/183.14 |
| 5,673,387 A | 9/1997 | Chen et al. ............ 395/183.14 |
| 5,742,754 A | 4/1998 | Tse |
| 5,758,061 A | 5/1998 | Plum ..................... 395/183.11 |
| 5,778,230 A | 7/1998 | Wimble et al. |
| 5,790,117 A | 8/1998 | Halviatti et al. |
| 5,893,128 A * | 4/1999 | Nauckhoff .................. 715/511 |
| 5,909,544 A | 6/1999 | Anderson, II et al. .. 395/200.38 |
| 5,910,895 A | 6/1999 | Proskauer et al. ...... 364/468.28 |
| 5,913,023 A | 6/1999 | Szermer |

FOREIGN PATENT DOCUMENTS

WO  WO 98/57187  12/1998

OTHER PUBLICATIONS

U.S. patent application Ser. No. 09/550,387, filed Apr. 14, 2000, Rene Morales, Jr., et al.

"System Verification Using Multiple Independent Simulation Engines Running Under Common Control," IBM Technical Disclosure Bulletin, vol. 30 No. 01 Jun. 1987, pp. 340–342.

(List continued on next page.)

Primary Examiner—Norman M. Wright
(74) Attorney, Agent, or Firm—Marilyn Smith Dawkins; Bracewell & Patterson, L.L.P.

(57) ABSTRACT

A data processing system, method, and program including an automated software test environment are disclosed for generating a job to be executed within the automated software test environment to test a software application. A work flow manager is established for automatically managing the automated software test environment. The automated software test environment includes multiple computer systems coupled to a server computer system utilizing a network. The work flow manager is executed utilizing the server computer system. Execution of the automated test environment is controlled utilizing the work flow manager in response to a receipt of external events generated by the plurality of computer systems. A job description is created including an identification of one of the external events. A job described by the job description is executed utilizing the work flow manger in response to a receipt of the external event.

33 Claims, 13 Drawing Sheets

OTHER PUBLICATIONS

Software Validation Test Facilitator "test scripts," IBM Technical Disclosure Bulletin, vol. 35 No. 4B Sep. 1992, pp. 212–215.

"Automated Code Checker," IBM Technical Disclosure Bulletin, vol. 36 No. 09B Sep. 1993, pp. 239–240.

"Functional Test Case Identification in an Object–Oriented Environment Using Matrix Progression Techniques," IBM Technical Disclosure Bulletin, vol. 37 No. 01 Jan. 1994, pp. 503–505.

"Error Detection/Fault Isolation in VHDL," IBM Technical Disclosure Bulletin, vol. 39 No. 03 Mar. 1996, p. 27.

"Advanced Computer System Evaluation Architecture," IBM Technical Disclosure Bulletin, vol. 37 No. 10 Oct. 1994, pp. 467–468.

"Method of Controlling Development Phases of Computer Software," IBM Technical Disclosure Bulletin, vol. 33 No. 1B Jun. 1990, pp. 114–116.

"Functional Test Case Identification in an Object–Oriented Environment using Matrix Progression Techniques," IBM Technical Disclosure Bulletin, vol. 37 No. 01 Jan. 1994, pp. 503–505.

"Defect Isolation," IBM Technical Disclosure Bulletin, vol. 37 No. 04A Apr. 1994, pp. 239–240.

"Non–Invasive Automation of Software Test With Shared Peripherals," IBM Technical Disclosure Bulletin, vol. 35 No. 2 Jul. 1992, pp. 230–232.

"Software Test Coverage Measurement," IBM Technical Disclosure Bulletin, vol. 39 No. 08 Aug. 1996, pp. 223–225.

"System and Method for Portable Server–Based Active Process Flow Software Components," Research Disclosure, Apr. 1999, p. 567.

* cited by examiner

Syntax Legend
    [ ... ] - means the enclosed data is optional
    { ... } - means the enclosed data is optional and can occur multiple times
    < ... > - means the enclosed data is variable
    ' ... ' - means the enclosed data should have SINGLE quotes around it
    | - signifies "or"

Language Template is below:

```
// This is a comment.

/* This is a
comment
*/

[PRIORTY <Number>]
{INCLUDE ' <Path and Filename> '}
[TERMINATE <FAILING | ALL>]
{VAR <Variable Name> = ' <Value> '}

[
EVENTS
  [ BUILDEVENT
    PRODUCT '<Product Name>'
    [BUILD <ANY | ALL | '<Build Name> | <Build Name> | Etc.' >]
    [NLV <ANY | ALL | '<NLV Name> | <NLV Name> | Etc.'>]
    END
  ]
END
]

PROCESS
  [NAME <Process Name>]
  COMMAND <Command executable>
  [PARMS '<Parameters>']
  {VAR <Variable Name> = '<Value>'}
  [WORKDIR '<Working Directory>']
  [TITLE '<Title>']
  [OTHER ' <Other Process Info.>']
  {ENV <Environment Variable Name> = '<Value>'}
  [MACHINE <DUT | <Machine Name>]

[
INIT
  {PROCESS Block}
  {PROCREF <Process Name>}
  {PROCGROUPREF <Process Group Name>}
  {PROCGROUP Block}
```

*Fig. 6A*

```
END
]

[
INSTALL
   {PROCESS Block}
   {PROCREF <Process Name>}
   {PROCGROUPREF <Process Group Name>}
   {PROCGROUP Block}
END
]

[
TERM
   {PROCESS Block}
   {PROCREF <Process Name>}
   {PROCGROUPREF <Process Group Name>}
   {PROCGROUP Block}
END
]

[VALIDATE <NO | ZERO | RC <Value> | PROCREF <Process Name>>]

[ONVALIDATEERROR <LOG | NOTIFY | TERMINATE | PROCREF <Process Name>>]
END

PROCGROUP
   NAME <Process Group Name>
   EXETYPE <PARALLEL | SERIES>
   {VAR <Variable Name> = '<Value>'}
   {PROCESS Block}
   {PROCREF <Name>}
END DUT
   MACHINE <Machine Name>
   {VAR <Variable Name> = '<Value>'}
   [LOCK < EXCLUSIVE | NONEXCLUSIVE>]
   INIT
      {PROCESS Block}
      {PROCREF <Process Name>}
      {PROCGROUPREF <Process Group Name>}
      {PROCGROUP Block}
   END
   ]

[
   INSTALL
      {PROCESS Block}
      {PROCREF <Process Name>}
      {PROCGROUPREF <Process Group Name>}
      {PROCGROUP Block}
   END
   ]
```

*Fig. 6B*

```
EXE
   {PROCESS Block}
   {PROCREF <Process Name>}
   {PROCGROUPREF <Process Group Name>}
   {PROCGROUP Block}
END

[
TERM
   {PROCESS Block}
   {PROCREF <Process Name>}
   {PROCGROUPREF <Process Group Name>}
   {PROCGROUP Block}
END
]

END
```

*Fig. 6C*

```xml
<xml version="1.0"?>
<WORKFLOWMANAGERJOBDEFINITION PRIORITY="number" TERMINATE=ALL | FAILING">
  <!-- comment -->
  <VAR NAME="string" VALUE="string"/>
  >INCLUDE FILE="string"/>
  <EVENTS>
    </BUILDEVENT>
        <PRODUCT> string </PRODUCT>
        (<ALLBUILDS/> | <ANYBUILD/> | <BUILD NAME="string"/>)
        (<ALLNLVS/> | <ANYNLV/> | <NLV NAME="string"/>)
    </BUILDEVENT>
  </EVENTS>

<PROCESS NAME="string">
    <COMMAND> string </COMMAND>
    <PARMS> string </PARMS>
    <WORKDIR> string </WORKDIR>
    <TITLE> string </TITLE>
    <OTHER> string </OTHER>
    <VAR NAME="string" VALUE="string"/>
    <ENV NAME="string" VALUE="string"/>
    <INIT>
        <PROCREF NAME="string"/>
        <PROCGROUPREF NAME="string"/>
    </INIT>
    <INSTALL>
        <PROCREF NAME="string"/>
        <PROCGROUPREF NAME="string"/>
    </INSTALL>
    <TERM>
        <PROCREF NAME="string"/>
        <PROCGROUPREF NAME="string"/>
    </TERM>
    (<NOVALIDATE/> | <RCVALIDATE RC="number"/> | < PROCREFVALIDATE NAME="string"/>)
```

*Fig. 7A*

```
        (<LOGOVE/> | <NOTIFYOVE/> | <TERMINATEOVE/> | <PROCREFOVE
NAME="string"/>)
    </PROCESS>

<PROCGROUP NAME="string" TYPE="PARALLEL | SERIES">
        <VAR NAME="string" VALUE="string"/>
        <PROCREF NAME="string"/>
    </PROCGROUP>

<DUT MACHINE="string" LOCK= "EXCLUSIVE | NONEXCLUSIVE">
        <VAR NAME="string" VALUE="string"/>
        <INIT>
            <PROCREF NAME="string"/>
            <PROCGROUPREF NAME="string"/>
        </INIT>
        <INSTALL>
            <PROCREF NAME="string"/>
            <PROCGROUPREF NAME="string"/>
        </INSTALL>
        <EXE>
            <PROCREF NAME="string"/>
            <PROCGROUPREF NAME="string"/>
        </EXE>
        <TERM>
            <PROCREF NAME="string"/>
            <PROCGROUPREF NAME="string"/>
        </TERM>
    </DUT>

</WORKFLOWMANAGERJOBDEFINITION>
```

*Fig. 7B*

```
EVENTS
    EVENT
        PRODUCT 'Java 1.2'
        BUILD ALL
        NLV ALL
    END
END // this process will install the base on a DUT
PROCESS
    NAME InstOS2
    COMMAND cmd.exe
    PARMS '/c InstallOS2.cmd c v4 '
    WORKDIR 'e:\installCmds'
    MACHINE swDistServer1
    VALIDATE ZERO
    ONVALIDATEERROR TERMINATE
END // this process will install the STAF on a DUT
PROCESS
    NAME InstSTAF
```

*Fig. 8A*

```
    COMMAND cmd.exe
    PARMS '/c InstallSTAF.cmd c'
    WORKDIR 'e:\installCmds'
    MACHINE swDistServer1
    VALIDATE ZERO
    ONVALIDATEERROR TERMINATE
END
// this process will install the Java 1.2 on a DUT
PROCESS
    NAME InstJava
    COMMAND cmd.exe
    PARMS '/c InstallJava12.cmd c'
    WORKDIR 'e:\installCmds'
    MACHINE swDistServer1
    VALIDATE ZERO
    ONVALIDATEERROR TERMINATE
END
// this process will install the Java 1.2 regression tests on a DUT
PROCESS
    NAME InstJavaReg1
    COMMAND cmd.exe
    PARMS '/c InstallJavaRegTests1.cmd c'
    WORKDIR 'f:\testcases'
    MACHINE testCaseServer1
    VALIDATE ZERO
    ONVALIDATEERROR TERMINATE
END
PROCGROUP
    NAME InstallJavaRegs
    // this process will install more Java 1.2 regression tests on a DUT
    PROCESS
        NAME InstJavaReg2
        COMMAND cmd.exe
        PARMS '/c InstallJavaRegTests2.cmd c'
        WORKDIR 'f:\testcases'
        MACHINE testCaseServer1
        VALIDATE ZERO
        ONVALIDATEERROR TERMINATE
    END
    PROCREF InstJavaReg1
END
// this process will read the DUT's environment to validate process JavaReg1
PROCESS
    NAME ReadLog
    COMMAND cmd.exe
    PARMS '/c ReadLogRegTests1.cmd '
    WORKDIR '{TCPath} \testcases'
    VALIDATE RC 5
END
// this process will execute the Java 1.2 regression tests
PROCESS
    NAME JavaReg1
    COMMAND java.exe
    PARMS 'JavaRegTests1'
```

*Fig. 8B*

```
    WORKDIR '{TCPath}\testcases'
    MACHINE DUT
    TITLE 'Regression Test 1'
    VALIDATE PROCREF ReadLog
    ONVALIDATEERROR NOTIFY
END // this process will execute more Java 1.2 regression tests
PROCESS
    NAME JavaReg2
    COMMAND cmd.exe
    PARMS '/c JavaRegTests2.cmd'
    WORKDIR '{TCPath}\testcases'
    VALIDATE ZERO
    MACHINE testMachine1
    TITLE 'Regression Test 2'
    ONVALIDATEERROR LOG
END // this process will put the DUT back to a known state
PROCESS
    NAME resetDUT
    COMMAND reset.exe
    PARMS 'F'
    WORKDIR '{Bootdrive}\'
    VALIDATE NO
END DUT
    MACHINE testMachine1
    VAR TCPath = 'E:\javac'
    INIT
        PROCREF InstOS2
        PROCREF InstSTAF
    END INSTALL
        PROCREF InstJava
        PROCGROUPREF InstallJavaRegs
    END EXE
        PROCREF JavaReg1
        PROCREF JavaReg2
    END

TERM
        PROCREF RESETDUT
    END

END
```

*Fig. 8C*

DATA PROCESSING SYSTEM, METHOD AND PROGRAM FOR GENERATING A JOB WITHIN AN AUTOMATED TEST ENVIRONMENT

CROSS-REFERENCE TO RELATED APPLICATIONS

The present invention is related to the subject matter of co-pending patent application Ser. No. 09/550,387 entitled "DATA PROCESSING SYSTEM, METHOD, AND PROGRAM FOR AUTOMATICALLY TESTING SOFTWARE APPLICATIONS", assigned to the assignee herein named filed on Apr. 14, 2000, and incorporated herein by reference.

BACKGROUND OF THE INVENTION

1. Technical Field

The present invention relates in general to data processing systems and, in particular, to a data processing system, method, and program for automatically testing software applications. Still more particularly, the present invention relates to a data processing system, method, and program for automatically generating a job within an automated test environment for testing software applications utilizing an event-driven work flow manager.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, and Aptiva series.

An important part of software development is testing whether a particular software application functions as intended and without encountering errors. Typically, a large number of tests will be repeatedly executed on the software application. In order to perform these tests efficiently, a variety of software testing devices have been disclosed. These devices typically describe a testing method to be executed utilizing a single computer system which is also executing the software application being tested. The computer system will include the necessary test cases, any applications needed to execute the test cases, and all other necessary hardware or software components.

A tester who desires to execute the tests must oversee and control the testing environment. The tester is required to define the test cases, identify the computer system to execute the test cases, indicate to the computer system when a particular portion of the test should start executing, when a portion of the test has completed and when to begin executing the next portion of the test. Although the computer system will automatically execute the tests, the tester must manually control the execution of the tests.

SUMMARY OF THE INVENTION

A data processing system, method, and program including an automated software test environment are disclosed for generating a job to be executed within the automated software test environment to test a software application. A work flow manager is established for automatically managing the automated software test environment. The automated software test environment includes multiple computer systems coupled to a server computer system utilizing a network. The work flow manager is executed utilizing the server computer system. Execution of the automated test environment is controlled utilizing the work flow manager in response to a receipt of external events generated by the plurality of computer systems. A job description is created including an identification of one of the external events. A job described by the job description is executed utilizing the work flow manger in response to a receipt of the external event.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 6A, 6B, and 6C together illustrate a job description language in accordance with the present invention;

FIGS. 7A and 7B together illustrate an XML version of a job description language in accordance with the present invention; and FIGS. 8A, 8B, and 8C together illustrate an example job description in accordance with the present invention.

DETAILED DESCRIPTION OF PREFERRED EMBODIMENT

A data processing system, method, and program including an automated software test environment are disclosed for generating a job to be executed within the environment to test a software application. A work flow manager is established for automatically managing the automated software test environment. The automated software test environment includes multiple computer systems coupled to a server computer system utilizing a network. The work flow manager is executed utilizing the server computer system. Execution of the automated test environment is controlled utilizing the work flow manager in response to a receipt of external events generated by the plurality of computer systems.

The work flow manager accepts job definitions (also called "job descriptions"), waits for events external to the work flow manager in response to which the work flow manager controls the execution of a plurality of ordered test phases, executes the jobs based on test machine availability, provides job management facilities for a tester, logs execution results, and notifies testers upon test failure. Once a tester submits a job description to the work flow manager, the work flow manager automatically executes the test phases to complete the job.

The work flow manager is event driven. The work flow manager controls execution of the ordered test phases in response to the receipt of events. The work flow manager will automatically execute the test phases upon the availability of the test machines. When the job is complete, the work flow manager will report the results to the tester.

A job description includes a description of one or more test machines, a test process to be executed by the test machine, and an event which will trigger the work flow manager to automatically execute the job description. When the event occurs, the work flow manager will cause the specified test machine(s) to execute the specified test process utilizing the software application under test.

The job description may define one or more test processes to be executed by one or more test machines. Further, a single job description may cause the work flow manager to generate multiple jobs. For example, a tester may define the triggering event as being the build of all language versions of a particular product. Therefore, a separate job will be executed for each language version.

A job description is created including an identification of one of the external events. A job described by the job description is executed utilizing the work flow manger in response to a receipt of the external event.

Job descriptions may be submitted, deleted, held, listed, queried, or released. Job descriptions describe processes that the tester would like to execute, and the events that will trigger the execution of the job. A tester may restart, hold, query, list and/or terminate jobs.

Figure 1:
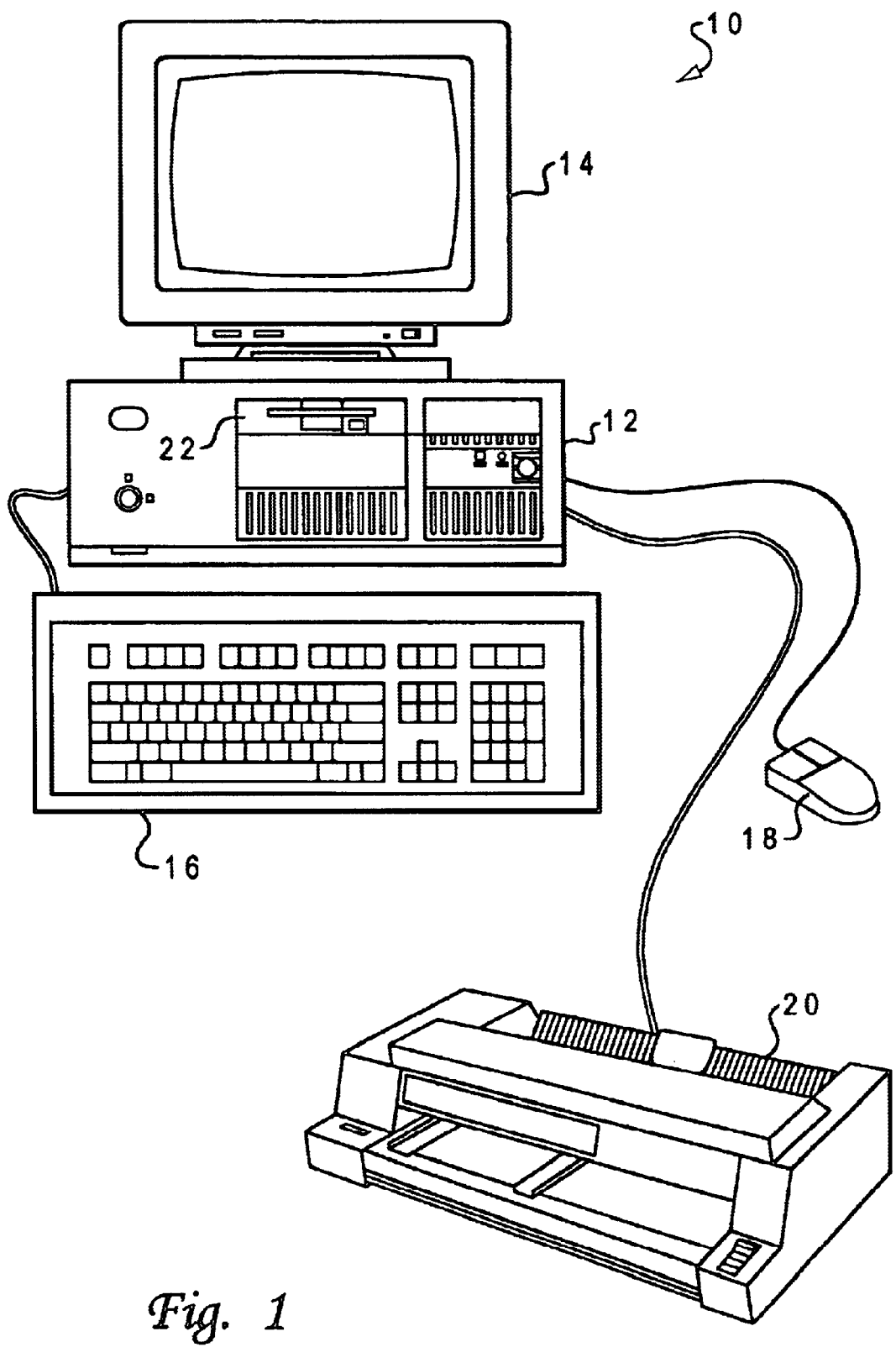
FIG. 1 depicts an illustrative embodiment of a data processing system with which the present invention may advantageously be utilized.

FIG. 1 illustrates a pictorial representation of a data processing system 10 in accordance with the present invention. Computer system 10 includes a computer 12, a monitor 14, a keyboard 16, a mouse 18, a plotter 20, a printer 21, and a floppy drive 22. Computer system 10 may be implemented utilizing any commercially available computer system which has been suitably programmed and which has been modified as described below. Computer system 10 is capable of receiving a variety of different types of inputs from a variety of different types of input devices. Keyboard 16 and mouse 18 are two such types of input devices.

Figure 2:
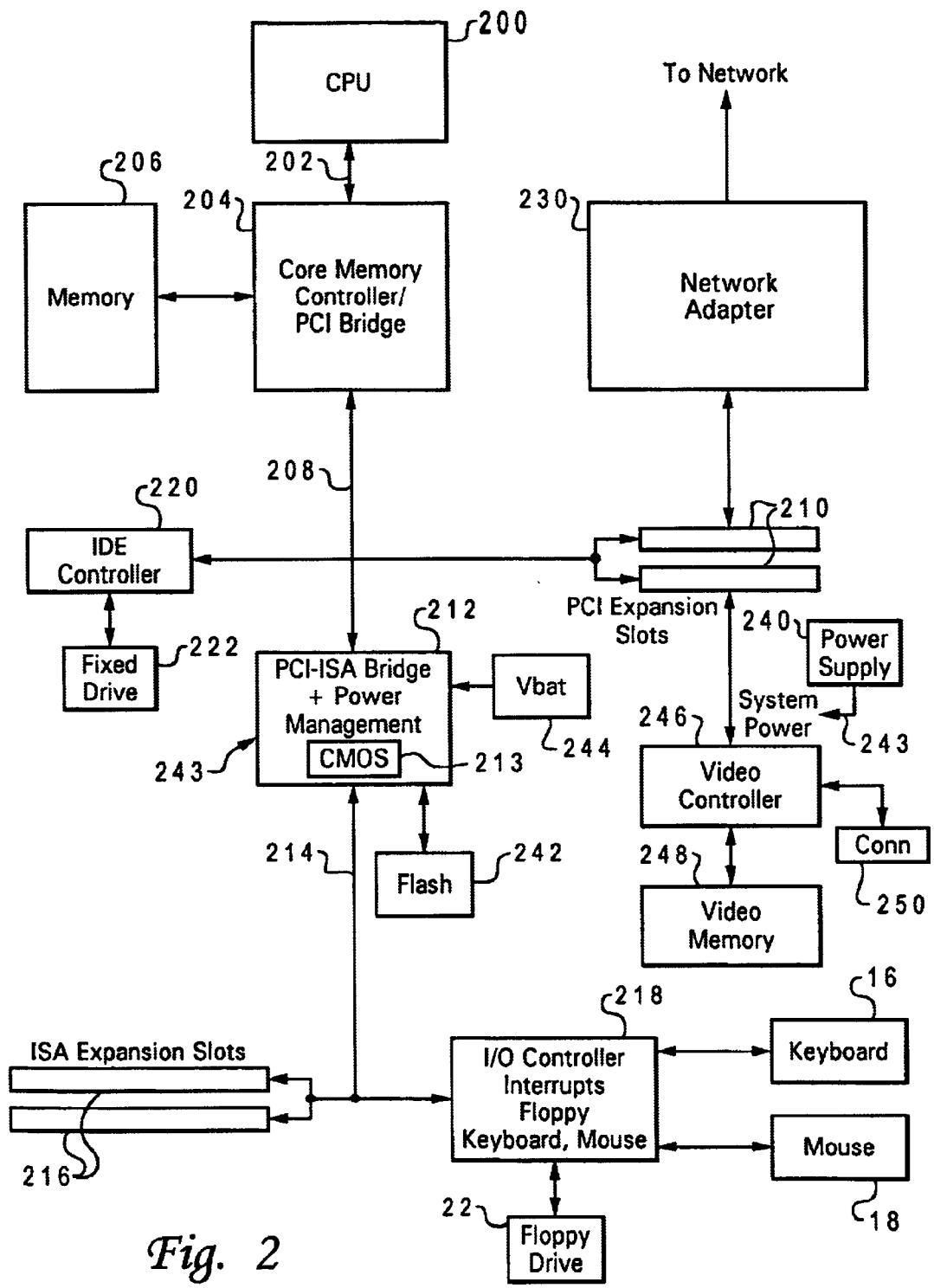
FIG. 2 illustrates a more detailed pictorial representation of the computer system of FIG. 1 in accordance with the present invention.

FIG. 2 depicts a more detailed pictorial representation of the computer system of FIG. 1 in accordance with the present invention. Computer system 12 includes a planar (also commonly called a motherboard or system board) which is mounted within computer 12 and provides a means for mounting and electrically interconnecting various components of computer 12 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices, such as a removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as keyboard 16, mouse 18, and floppy drive 22 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Computer 12 includes a video controller 246 which may, for example, be plugged into one of PCI expansion slots 210. Video controller 246 is connected to video memory 248. The image in video memory 248 is read by controller 246 and displayed on monitor 14 which is connected to computer 12 through connector 250.

Computer 12 includes a power supply 240 which supplies full normal system power 243.

Computer 12 also includes a network adapter 230. Network adapter 230 may be plugged into one of the PCI connector slots 210. (as illustrated) or one of the ISA connector slots 216 in order to permit computer 12 to communicate with a network.

Figure 3:
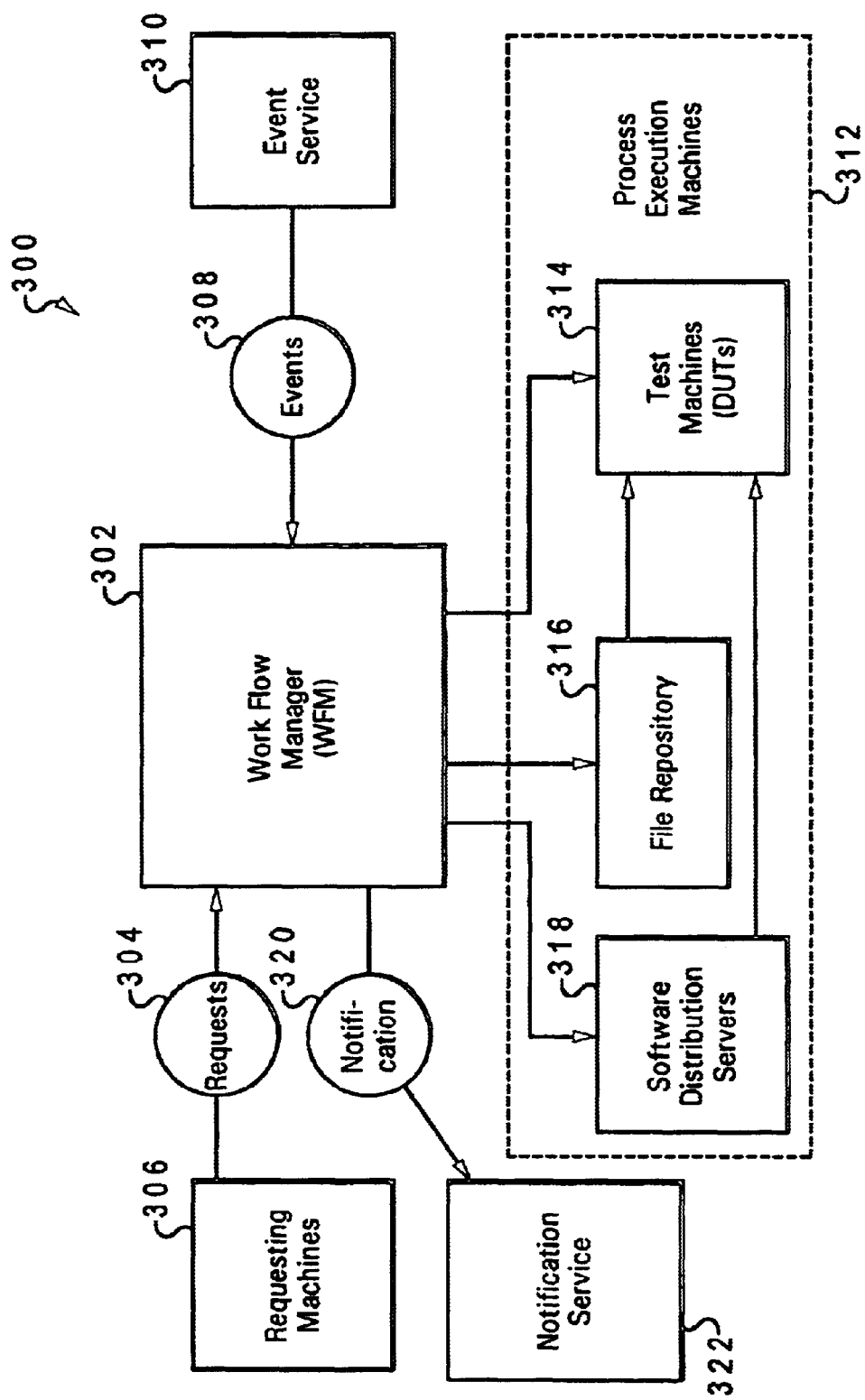
FIG. 3 is a high level block diagram which depicts an automated software test environment in accordance with the present invention.

FIG. 3 is a high level block diagram which depicts an automated software test environment 300 in accordance with the present invention. Automated software test environment 300 includes multiple computer systems, such as depicted in FIGS. 1 and 2, coupled together utilizing a network. Automated software test environment 300 includes a work flow manager 302 which coordinates all aspects of the automated testing of a software application. Work flow manager 302 receives requests 304, also called job descriptions or job definitions, from requesting computer systems, i.e. requesting machines 306. An event service 310 generates events 308, such as INIT events and INSTALL events, to indicate to work flow manager the start of one of the test phases.

Work flow manager 302 controls operation of multiple process execution machines 312. Process execution machines 312 includes computer system selected to be test machines 314 executing the software application under test, a file repository 316, and software distribution servers 318. The test machines are also referred to as DUTs (device-under-test). File repository 316 stores test case files and other files necessary for test machines 314 to execute the required tests. Software distribution servers 318 are utilized to store applications which might be needed in test machines 314 in order to execute the tests.

Work flow manager 302 provides a notification 320 to a notification service 322 in response to the operation of the process execution machines 312. Notification 320 may be one of several different types of notifications. For example, notification service 322 may be notified that execution of the test cases for the software application under test completed execution, the execution of the test cases for the software application under test did not complete execution, and/or the results of the various test cases.

Figure 4:
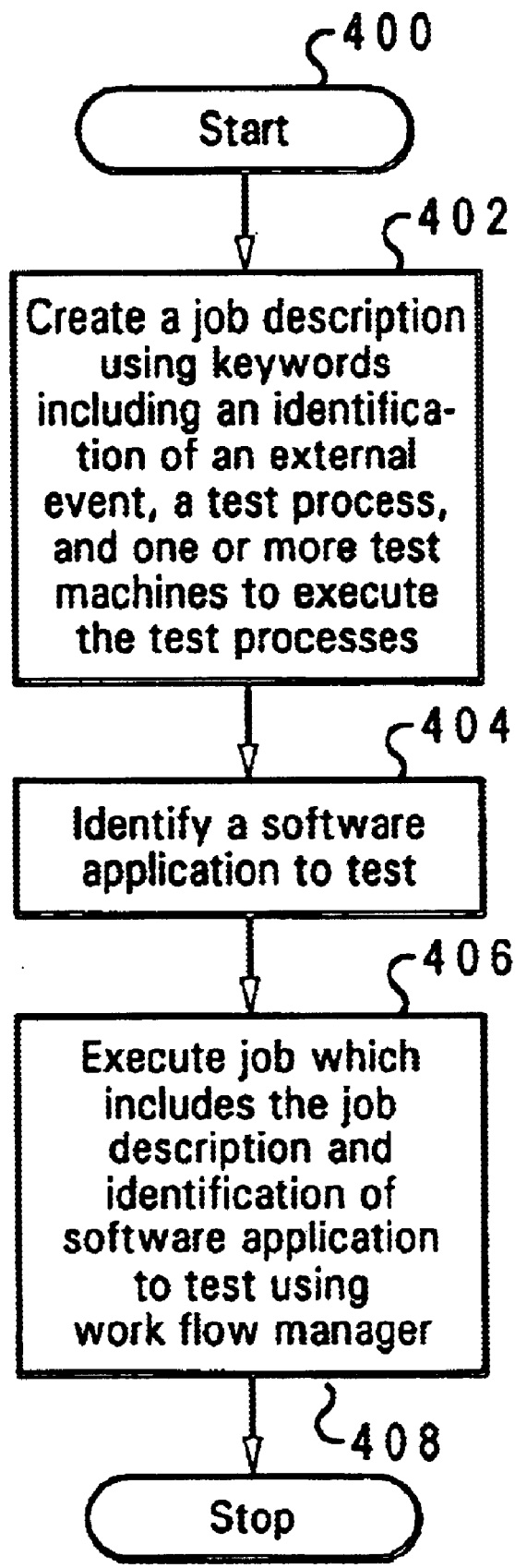
FIG. 4 illustrates a high level flow chart which depicts a creation of a job including a job description in accordance with the present invention.

FIG. 4 illustrates a high level flow chart which depicts a creation of a job including a job description in accordance with the present invention. The process starts as depicted by block 400 and thereafter passes to block 402 which illustrates a creation of a job description using keywords included within the job description language. The job description includes an identification of an external event which will cause the work flow manager to execute the job, a test process, and one or more computer systems which will be the test machines which execute the test process. The test machines are also referred to as DUTs (device-under-test). Next, block 404 depicts an identification of a software application to test. The process then passes to block 406 which illustrates the execution of the job. A job includes a job description and an identification of a software application to test. The job is executed utilizing the work flow manager. The process then terminates as depicted by block 408.

Figure 5:
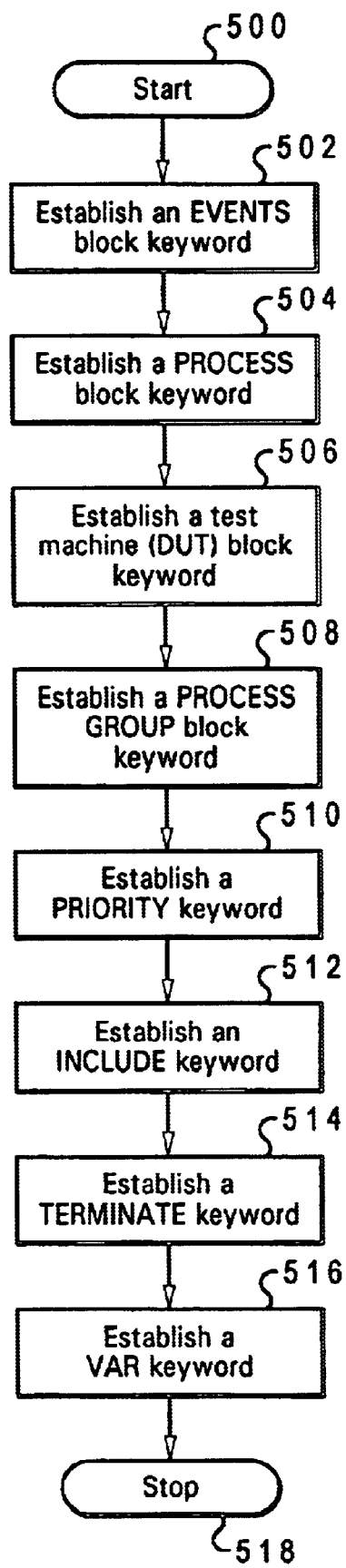
FIG. 5 depicts a high level flow chart which illustrates establishing a plurality of keywords included within a job description language in accordance with the present invention.

FIG. 5 depicts a high level flow chart which illustrates establishing a plurality of keywords included within a job description language in accordance with the present invention. The process starts as depicted by block 500 and thereafter passes to block 502 which illustrates establishing an EVENTS block keyword. For each job, an EVENTS block is created. The events which will trigger work flow manager 302 to execute the job are defined within the EVENTS block. Within the EVENTS block, a BUILD-EVENT block is specified. A particular build event is defined within the BUILDEVENT block which will cause work flow manager 302 to begin executing this job definition. If a BUILDEVENT block is not specified, the work flow manager will not be able to automatically execute the job description.

A PRODUCT, a BUILD, and an NLV may be specified within a BUILDEVENT block. The PRODUCT keyword specifies a particular software application product to be tested. The BUILD keyword specifies a build version name. The BUILD keyword could specify ALL to indicate that the job description will include all built versions of the software application specified by the PRODUCT keyword. The NLV keyword specifies a language identifier. The NLV keyword could specify ALL to indicate that the job description will include all existing language versions of the software application specified by the PRODUCT keyword.

The process passes to block 5.04 which illustrates establishing a PROCESS block keyword. The PROCESS keyword specifies a process block. The PROCESS block specifies one process to execute. At least one process block must be included in each job description. Within the PROCESS block, the following keywords may be utilized: NAME, COMMAND, PARMS, VAR, ENV, WORKDIR, TITLE, OTHER, MACHINE, an INIT block, an INSTALL block, a TERM block, VALIDATE, and ONVALIDATEERROR. The NAME keyword specifies a name given to the test process specified by this process block. The specified NAME may be used by other keywords to refer to this particular process. The COMMAND keyword specifies an executable routine which will run the test process specified within this PROCESS block. The PARMS keyword specifies the parameters to pass to the executable specified by COMMAND. The VAR keyword is used to specify variables which may then be accessed by the processes defined by this process block. The WORKDIR keyword specifies the directory where the executable defined by the COMMAND keyword will execute. The TITLE keyword specifies the title of the executable which was specified by COMMAND. The TITLE is the title of the program that is passed to the operating system, where applicable. The OTHER keyword specifies any other parameter that might be specified. The ENV keyword specifies an environment variable that could be set for the process. The path and classpath are examples of environment variables used frequently. The MACHINE keyword specifies whether the process should be run on the computer system designated by the DUT block, described below, to be the test machine (also called "DUT"), or a different computer system.

Processes which will be executed when the build of the product specified by the EVENTS block is propagated to the public computer systems are specified within an INIT block. Within the INIT block, a PROCESS block, a PROCREF keyword, PROCGROUPREF keyword, and PROCGROUP BLOCK may be included. The PROCESS block will define a process embedded within this process block. The PROCREF keyword is used to specify a reference to a top level process, i.e. the PROCREF keyword identifies a previously defined process block. This allows for the same process block to be used more than once in a definition without having to be rewritten. For example, the PROCREF keyword may specify a process that re-boots the DUT which may need to occur throughout the job. The PROCGROUPREF keyword is used to specify a top level process group. This allows the same group of processes to be called multiple times in a job without having to be rewritten. The PROCGROUP block specifies a process group embedded within this process. These INIT processes for this PROCESS block will be executed after all INIT blocks, if any exist, are executed which are included within the DUT block.

Processes which will execute when the build of the product specified by the EVENTS block is propagated to the public computer systems and after the INIT block processes complete execution are specified within an INSTALL block. Within the INSTALL block, a PROCESS block, a PROCREF keyword, PROCGROUPREF keyword, and PROCGROUP BLOCK may be included. These INSTALL processes for this PROCESS block will be executed after all INSTALL blocks, if any exist, are executed which are included within the DUT block.

Processes which will execute after this process has completed execution and has been validated are defined within a TERM block. Within the TERM block, a PROCESS block, a PROCREF keyword, PROCGROUPREF keyword, and PROCGROUP BLOCK may be included.

The VALIDATE keyword is used to determine how to validate this process's success. One of the following keywords may precede VALIDATE: NO, ZERO, RC, or PROCREF. When NO VALIDATE is specified, the process will always be considered to be successful. When ZERO VALIDATE is specified the process will be considered to be successful if the return code is "0". When RC <value> VALIDATE is specified, the process will be considered to be successful if the return code is "value". When PROCREF VALIDATE is specified, the process will be considered to be successful if the process identified by PROCREF is successfully executed.

The ONVALIDATEERROR keyword is used to specify what will happen when a process fails validation. One of the following keywords may precede ONVALIDATEERROR: LOG, NOTIFY, TERMINATE, or PROCREF. When LOG ONVALIDATEERROR is specified, the error will be logged and the job continued. When NOTIFY ONVALIDATEERROR is specified, the machine specified by the NOTIFY keyword will be notified, and the job held. When TERMINATE ONVALIDATEERROR is specified, if a machine is specified by the NOTIFY keyword, that machine will be notified and the job terminated. If no machine is specified, the job will be terminated. When PROCREF ONVALIDATEERROR is specified, a new process will be executed upon the failure to validate the process.

The process then passes to block 506 which depicts establishing a test machine, or DUT, block. A test machine to execute the test process is specified within the DUT block. The following keywords may be utilized within the DUT block: MACHINE, VAR, LOCK, INIT, INSTALL, EXE, and TERM. The MACHINE keyword within the DUT block will specify which computer system is to be utilized as the test machine. The variables set by VAR may be accessed by the processes which are executed within the DUT block. The LOCK keyword specifies whether or not the machine designated as this test machine will be able to execute other jobs while this job is being executed. If the test machine is locked, it will not be able to execute other jobs.

Processes which will be executed when the build of the product specified by the EVENTS block is propagated to the public computer systems are specified within an INIT block. Within the INIT block, a PROCESS block, a PROCREF keyword, PROCGROUPREF keyword, and PROCGROUP BLOCK may be included. These INIT processes for this DUT block are executed prior to any INIT blocks which are specified within PROCESS blocks.

Processes which will execute when the build of the product specified by the EVENTS block is propagated to the public computer systems and after the INIT block processes have completed execution are specified within an INSTALL block. Within the INSTALL block, a PROCESS block, a PROCREF keyword, PROCGROUPREF keyword, and PROCGROUP BLOCK may be included. These INSTALL processes for this DUT block are executed prior to execution of any INSTALL blocks which are specified within PROCESS blocks.

Processes which will execute when the INSTALL processes have completed execution are specified within an EXE block. The EXE block specifies the actual test processes. Within the EXE block, a PROCESS block, a PROCREF keyword, PROCGROUPREF keyword, and PROCGROUP BLOCK may be included.

Processes which will execute after the execution of the EXE block are defined within a TERM block. Within the TERM block, a PROCESS block, a PROCREF keyword, PROCGROUPREF keyword, and PROCGROUP BLOCK may be included.

The process then passes to block 508 which illustrates establishing a PROCESSGROUP keyword. The PROCESSGROUP keyword specifies a group of processes that execute either in parallel or series. Within the PROCESSGROUP, the following keywords may be specified: NAME, EXETYPE, PARALLEL, SERIES, VAR, PROCESS, and PROCREF. The NAME keyword is used to specify a name for this process group. The EXETYPE keyword is utilized to specify an execution method, either PARALLEL or SERIES, for this process group. When PARALLEL is specified, the processes in the group will execute concurrently. When SERIES is specified, the first specified process will completely execute, then the next specified process will completely execute. The VAR keyword specifies any variables to be set for this process group. The PROCESS block defines a process to include in this process group. The PROCREF specifies a top level process to include in this process group.

The process then passes to block 510 which illustrates establishing a PRIORITY keyword. A PRIORITY keyword defines a relative priority for the job. The work flow manager will utilize the priority specified for each job when scheduling these jobs. The process then passes to block 512 which depicts establishing an INCLUDE keyword. The INCLUDE keyword permits a tester to embed other files into the job definition. For example, the job definition may be divided into small sections so that job definitions can share the same files. The process then passes to block 514 which illustrates establishing a TERMINATE keyword. When a process being executed utilizing a test machine fails, a decision must be made by the work flow manager regarding whether to terminate the execution by the test machine which executed the failing process, or all of the test machines which are executing processes as defined by the job description. The TERMINATE keyword specifies whether to terminate testing only the test machine which executed the failing test, or all of the test machines which are defined by the job description. Thereafter, the process passes to block 516 which depicts establishing a VAR keyword. The VAR keyword specifies a variable which the processes can access. Variables allow the executed process to operate slightly differently without having to be rewritten for each modification. The process then terminates as depicted by block 518.

FIGS. 6A, 6B, and 6C together illustrate a job description language in accordance with the present invention.

FIGS. 7A and 7B together illustrate an XML version of a job description language in accordance with the present invention.

FIGS. 8A, 8B, and 8C together illustrate an example job description in accordance with the present invention.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system including an automated software test environment for generating a job to be executed within said automated software test environment to test a software application, said method comprising the steps of:

establishing a work flow manager for automatically managing said automated software test environment, said automated software test environment including a plurality of computer systems coupled to a server computer system utilizing a network, said work flow manager being executed utilizing said server computer system;

controlling execution of said automated test environment utilizing said work flow manager in response to a receipt of external events generated by said plurality of computer systems;

creating a job description including an identification of one of said external events; and executing a job described by said job description utilizing said work flow manger in response to a receipt of said one of said external events.

2. The method according to claim 1, wherein said step of creating a job description further comprises the step of creating a job description including an identification of at least one of said plurality of computer systems to utilize to execute said job described by said job description.

3. The method according to claim 1, wherein said step of creating a job description further comprises the step of creating a job description including an identification of at least one test process to execute utilizing said at least one of said plurality of computer systems to utilize to execute said job described by said job description.

4. The method according to claim 1, further comprising the step of providing a job description language including a plurality of keywords.

5. The method according to claim 4, wherein the step of creating a job description further comprises the step of creating a job description utilizing said job description language.

6. The method according to claim 5, wherein the step of providing a job description language including a plurality of keywords further comprises the step of providing a keyword which identifies said one of said external events.

7. The method according to claim 5, wherein said step of creating a job description further comprises the step of creating a job description including an identification of at least one of said plurality of computer systems to utilize to execute said job described by said job description.

8. The method according to claim 7, wherein the step of providing a job description language including a plurality of keywords further comprises the step of providing a keyword which identifies said at least one of said plurality of computer systems.

9. The method according to claim 5, wherein the step of creating a job description further comprises the step of creating a job description including an identification of at least one test process to execute utilizing said at least one of said plurality of computer systems to utilize to execute said job described by said job description.

10. The method according to claim 9, wherein the step of providing a job description language including a plurality of keywords further comprises the step of providing a keyword which identifies said at least one test process.

11. The method according to claim 1, further comprising the step of executing a plurality of jobs described by said job description utilizing said work flow manger in response to a receipt of said one of said external events.

12. A data processing system including an automated software test environment for generating a job to be executed within said automated software test environment to test a software application, comprising:

means for establishing a work flow manager for automatically managing said automated software test environment, said automated software test environment including a plurality of computer systems coupled to a server computer system utilizing a network, said work flow manager being executed utilizing said server computer system;

means for controlling execution of said automated test environment utilizing said work flow manager in response to a receipt of external events generated by said plurality of computer systems;

means for creating a job description including an identification of one of said external events; and means for executing a job described by said job description utilizing said work flow manger in response to a receipt of said one of said external events.

13. The system according to claim 12, wherein said means for creating a job description further comprises means for creating a job description including an identification of at least one of said plurality of computer systems to utilize to execute said job described by said job description.

14. The system according to claim 12, wherein said means for creating a job description further comprises means for creating a job description including an identification of at least one test process to execute utilizing said at least one of said plurality of computer systems to utilize to execute said job described by said job description.

15. The system according to claim 12, further comprising means for providing a job description language including a plurality of keywords.

16. The system according to claim 15, wherein said means for creating a job description further comprises means for creating a job description utilizing said job description language.

17. The system according to claim 16, wherein said means for providing a job description language including a plurality of keywords further comprises means for providing a keyword which identifies said one of said external events.

18. The system according to claim 16, wherein said means for creating a job description further comprises means for creating a job description including an identification of at least one of said plurality of computer systems to utilize to execute said job described by said job description.

19. The system according to claim 18, wherein said means for providing a job description language including a plurality of keywords further comprises means for providing a keyword which identifies said at least one of said plurality of computer systems.

20. The system according to claim 16, wherein said means for creating a job description further comprises means for creating a job description including an identification of at least one test process to execute utilizing said at least one of said plurality of computer systems to utilize to execute said job described by said job description.

21. The system according to claim 20, wherein said means for providing a job description language including a plurality of keywords further comprises means for providing a keyword which identifies said at least one test process.

22. The system according to claim 12, further comprising means for executing a plurality of jobs described by said job description utilizing said work flow manger in response to a receipt of said one of said external events.

23. A computer program product including an automated software test environment for generating a job to be executed within said automated software test environment to test a software application, said computer program product comprising:

instruction means for establishing a work flow manager for automatically managing said automated software test environment, said automated software test environment including a plurality of computer systems coupled to a server computer system utilizing a network, said work flow manager being executed utilizing said server computer system;

instruction means for controlling execution of said automated test environment utilizing said work flow manager in response to a receipt of external events generated by said plurality of computer systems;

instruction means for creating a job description including an identification of one of said external events; and instruction means for executing a job described by said job description utilizing said work flow manger in response to a receipt of said one of said external events.

24. The computer program product according to claim 23, wherein said instruction means for creating a job description further comprises instruction means for creating a job description including an identification of at least one of said plurality of computer systems to utilize to execute said job described by said job description.

25. The computer program product according to claim 23, wherein said instruction means for creating a job description further comprises instruction means for creating a job description including an identification of at least one test process to execute utilizing said at least one of said plurality of computer systems to utilize to execute said job described by said job description.

26. The computer program product according to claim 23, further comprising instruction means for providing a job description language including a plurality of keywords.

27. The computer program product according to claim 26, wherein said instruction means for creating a job description further comprises instruction means for creating a job description utilizing said job description language.

28. The computer program product according to claim 27, wherein said instruction means for providing a job description language including a plurality of keywords further comprises instruction means for providing a keyword which identifies said one of said external events.

29. The computer program product according to claim 27, wherein said instruction means for creating a job description further comprises instruction means for creating a job description including an identification of at least one of said plurality of computer systems to utilize to execute said job described by said job description.

30. The computer program product according to claim 29, wherein said instruction means for providing a job description language including a plurality of keywords further comprises instruction means for providing a keyword which identifies said at least one of said plurality of computer systems.

31. The computer program product according to claim 27, wherein said instruction means for creating a job description further comprises instruction means for creating a job description including an identification of at least one test process to execute utilizing said at least one of said plurality of computer systems to utilize to execute said job described by said job description.

32. The computer program product according to claim 31, wherein said instruction means for providing a job description language including a plurality of keywords further comprises instruction means for providing a keyword which identifies said at least one test process.

33. The computer program product according to claim 23, further comprising instruction means for executing a plurality of jobs described by said job description utilizing said work flow manger in response to a receipt of said one of said external events.

* * * * *